United States Patent
Antraygue

(10) Patent No.: US 9,904,256 B2
(45) Date of Patent: Feb. 27, 2018

(54) PROCESS AND DEVICE FOR CONTROLLING AN OPERATING LEVER OF A VEHICLE

(71) Applicant: RATIER FIGEAC, FIGEAC (FR)

(72) Inventor: Cedric Antraygue, Figeac (FR)

(73) Assignee: RATIER FIGEAC, Figeac (FR)

( * ) Notice: Subject to any disclaimer, the term of this patent is extended or adjusted under 35 U.S.C. 154(b) by 124 days.

(21) Appl. No.: 14/593,231

(22) Filed: Jan. 9, 2015

(65) Prior Publication Data
US 2015/0198930 A1 Jul. 16, 2015

(30) Foreign Application Priority Data

Jan. 14, 2014 (FR) ..................................... 14 50275

(51) Int. Cl.
*B64D 31/06* (2006.01)
*H02P 6/00* (2016.01)
(Continued)

(52) U.S. Cl.
CPC .............. *G05B 1/01* (2013.01); *B64D 31/06* (2013.01); *G05B 11/42* (2013.01); *H02P 6/28* (2016.02)

(58) Field of Classification Search
CPC ...... H02P 6/28; H02P 7/00; H02P 3/00; H02P 21/00; G05B 1/01; G05B 11/42; B64D 31/00; B64D 31/06; B64C 13/503
See application file for complete search history.

(56) References Cited

U.S. PATENT DOCUMENTS 5,613,652 A      3/1997   Greene
5,998,954 A  *  12/1999   Scholten ................. F02D 11/10
                                                     318/599
(Continued)

FOREIGN PATENT DOCUMENTS

EP    2 264 556 A1   12/2010
FR    2 993 065 A1    1/2014
WO    03/040844 A2    5/2003

OTHER PUBLICATIONS

Jeff Wilson: "Introduction to ACIM and PMSM Motor Control", Freescale Technology Forum, Freescale Semiconductor, Jul. 2009 (Jul. 30, 2009), pp. 1-26, XP055152673, Extrait de l 'Internet: URL:http://www.freescale.comffiles/trainingpdf/VFTF09 AZ134. pdf?lang cd=en.
(Continued)

*Primary Examiner* — Eduardo Colon Santana
*Assistant Examiner* — Said Bouziane
(74) *Attorney, Agent, or Firm* — Young & Thompson

(57) ABSTRACT

A process and device for controlling a synchronous motor driving an operating lever in opposition to a friction brake, including a sensor for sensing the position of the lever, and a control computer include:
 a first regulator defining a nominal control voltage (U*) as a function of a difference ($\Delta\omega$) between the speed of rotation ($\omega$_feedback) of the motor and a set-point speed ($\omega$_cmd);
 a second regulator determining saturation limits (−Usat; +Usat) of the nominal control voltage as a function of an instantaneous torque provided by the motor;
 a saturator providing a limited control voltage (U_cmd) on the basis of the nominal control voltage and on the basis of the saturation limits;
 a converter feeding each winding of the motor with an alternating-voltage signal (U_alim) worked out on the
(Continued)

basis of the limited control voltage as a function of the angular position of the motor.

16 Claims, 3 Drawing Sheets

(51) Int. Cl.
 *G05B 1/01* (2006.01)
 *G05B 11/42* (2006.01)
 *H02P 6/28* (2016.01)

(56) References Cited

U.S. PATENT DOCUMENTS

| | | | |
|---|---|---|---|
| 8,025,256 B2 * | 9/2011 | Miller | B64C 13/10 244/17.13 |
| 9,469,393 B2 | 10/2016 | Antraygue | |
| 2005/0046370 A1 * | 3/2005 | Gallegos-Lopez | H02P 21/06 318/434 |
| 2009/0125166 A1 * | 5/2009 | Johnson | B64C 13/10 701/3 |
| 2012/0053735 A1 * | 3/2012 | Tessier | B64C 13/04 700/275 |
| 2012/0053762 A1 | 3/2012 | Stiefenhofer et al. | |
| 2013/0113408 A1 * | 5/2013 | Lee | H02P 21/05 318/494 |
| 2013/0162418 A1 * | 6/2013 | Frayman | B64C 13/10 340/407.2 |

OTHER PUBLICATIONS

French Search Report dated Nov. 13, 2014, in corresponding French priority application.

\* cited by examiner

PROCESS AND DEVICE FOR CONTROLLING AN OPERATING LEVER OF A VEHICLE

FIELD OF THE INVENTION

The invention concerns a process and a device for controlling an operating lever of a vehicle, notably a throttle lever of an aircraft, pivoting about an axis and having an angular position that determines a control applied to at least one flight control surface or to the means of propulsion of the vehicle. In particular, the invention concerns a process and a device for controlling an operating lever that is suitable to be controlled simultaneously by an autopilot system and by a human pilot.

BACKGROUND OF THE INVENTION

In modern vehicles, and notably in aircraft, the piloting/steering of the vehicle calls upon numerous operating levers, control handles and other control elements which may be subjected sometimes to a manual control implemented by a human pilot, sometimes to an automatic control worked out by an autopilot system, and at times to both simultaneously.

For example, a throttle lever of an aircraft is constituted in general by a lever pivoting about an axis in a sagittal plane of the aircraft between an extreme angular position in which the lever is oriented towards the rear of the plane, this position corresponding to a minimum of thrust of the engines, and an opposite extreme angular position corresponding to the maximal thrust. Of course, other movements—for example, translation, translation along a curve, etc.—are possible, according to the kinematic linkage installed. In an aircraft equipped with an autopilot system the thrust of the engines can be controlled by this system in accordance with previously established programming. However, in order to give information to the pilot about the thrust demanded by the autopilot system it is common practice to equip the lever with an electric motor driving an appropriate kinematic linkage aiming to displace the lever between its extreme positions, in order to reflect the position corresponding to the thrust demanded. Such a device is called an autothrottle.

Furthermore, when the autopilot system is deactivated the pilot can manipulate the operating lever so as to define the appropriate thrust in the current flight phase. In the case of aircraft equipped with electric controls ('fly by wire'), it is necessary to add a friction brake to the operating lever, in order to provide the pilot with a sensation of resisting force analogous to that caused by the friction of the linkage of the mechanical throttle levers and/or of the cables used previously.

However, in certain emergency cases the pilot is induced to manipulate the throttle lever without having deactivated the autopilot system, and may find himself/herself confronted with a situation in which he/she has to exert an inordinate force on the lever in order to overcome the control exerted by the electric motor acting on the throttle lever. It is therefore necessary to provide a limitation of the force necessary for the pilot to take over control from the autopilot system.

From patent U.S. Pat. No. 5,613,652, for example, a throttle lever of an aircraft is known which is driven in rotation by a servomotor controlled by a closed-loop control of the position of the lever. The servomotor is linked to the lever of the throttle by means of a friction clutch so as to enable the regaining of control of the throttle lever by the pilot without said pilot having to exert an excessive force in order to counter the control of the servomotor. The force necessary to overcome the control of the servomotor is thus limited to the resistance opposed by the friction of the clutch.

However, there are certain cases in which it is preferable that the electric motor is directly connected to the lever, for example in order to avoid a situation where the measurement of the position of the motor and of the lever are conflicting on account of the sliding of the clutch, or in order to enable a programming of notches or of active hard points that are suitable to enable a return of tactile position to the pilot.

In particular, in the case of a throttle lever having a displacement that is relatively slow, use is currently made of an electric motor of synchronous type, preferably with permanent magnets, which enables an excellent power-to-weight ratio to be obtained, produces a better output than the direct-current motor, and does not use brushes, thus avoiding wearing parts.

A synchronous motor comprises, from the mechanical point of view, a fixed part, the stator, and a part that is mobile in rotation about an axis, the rotor. The synchronous motor also comprises, from the electrical point of view, an inductor which generates the magnetic field enabling the operation of the motor, and an armature which, flowed through by a current, generates the torque and therefore the rotation of the motor. The inductor may be realised with permanent magnets (the case of the synchronous motor with permanent magnets) or by one or more coils flowed through by a direct current. Moreover, the inductor or the armature may be alternatively fixed or mobile—that is to say, stator or rotor. In the present text, by way of example and for reasons of simplicity, use is made of a synchronous motor with permanent magnets, the inductor of which, constituted by magnets, forms the rotor, and the armature of which, comprising windings, forms the stator. Consequently, since the inductor does not comprise coils, it is advisable to understand "winding of the armature of the motor" when reference is made, by simplification, to "winding of the motor". It is, however, possible to use any other variant, such as a wound inductor rotor and an armature on the stator, etc.

These synchronous motors, however, necessitate a more complex control than that of the direct-current motor, obtained by the implementation of electronic means. More generally, a motor assembly comprises the actual motor, with a stator forming the armature, preferably wound in three-phase manner (one winding per phase), and an inductor rotor, preferably with permanent magnets, a converter or inverter feeding each of the windings of the stator from the direct current, and a position sensor informing a control computer about the position of the motor.

Several control modes of the motor may be employed, such as, for example, the so-called six-state simple control, in which each of the windings of the motor is fed as a function of the angular position of the motor by gating pulses of voltage: positive constant voltage over 120°, zero voltage over 60°, negative constant voltage over the following 120°, then zero voltage over the last 60° for one of the windings, the feed of the two other windings being deduced therefrom by a phase shift of 120°.

Another control mode, so-called scalar control, consists in feeding each winding with a sinusoidal alternating voltage, generated for example by an inverter as a function of the position of the motor.

However, the preferred control mode of this type of motor remains the so-called 'vectorial' control, in which a control computer includes a part for vectorial control of the inverter, defining the frequency and the amplitude of the feed of the windings of the stator on the basis of the position of the motor and on the basis of control values of a first voltage, the so-called direct voltage Vd, and of a second voltage, the so-called quadratic voltage Vq, by employing mathematical transformations known under the name of PARK and CONCORDIA transforms. These transformations are implemented in a first vectorial-transformer block which transforms the two values of direct voltage and quadratic voltage into controls of the inverter, and in a second, inverse-vectorial-transformer block which, on the basis of controls applied by the inverter, provides a value of a first current, the so-called direct current Id, and of a second current, the so-called quadratic current Iq.

Whatever the control mode of the motor, the control computer also includes a part for determination of the control parameters, for example the voltage of the gating pulses for the six-state control, or the direct and quadratic voltages for vectorial control on the basis of set points for operation of the motor, such as, for example, its position or its speed of rotation or its torque.

Conventionally, a process for speed regulation of a synchronous motor with permanent magnets includes a first closed loop for regulation, receiving a set point for speed of rotation of the motor, a comparator for comparing this set point with a measurement of the speed of rotation of the motor, for example by differentiating the information about position of the motor with respect to time, and a regulator that is suitable to deduce a set-point torque of the motor from the speed error. The regulation includes a second closed loop for interleaved regulation, in which the set-point torque is compared to a measurement or an estimation of the instantaneous torque provided by the motor, and the torque error is transformed by a second regulator into a control value of at least one of the control parameters of the motor.

Usually the estimation of the instantaneous torque provided by the motor is realised on the basis of the measurement of the current consumed by said motor, for example by measuring the mean current consumed by the commutation device or the inverter.

The inventors have, however, ascertained that such a process presents drawbacks when it is a question of controlling the displacement of an operating lever of a throttle, for example.

In fact, in the case of a lever linked to a friction brake the load of the motor is almost constant, whatever the speed of displacement of the lever (and therefore the speed of rotation of the motor). Consequently, the conventional process for regulating the speed of the motor is not very robust and exhibits a large scattering, the current being substantially constant over the entire range of variation of speed of displacement of the lever.

SUMMARY OF THE INVENTION

The invention therefore aims to provide a process for controlling an operating lever that does not exhibit the drawbacks of the processes of the prior art.

The invention also aims to provide such a process that enables a regaining of control of the operating lever by the pilot without the latter having to exert a significant force, and more precisely so that the force for regaining control is capable of being regulated even when the lever is directly linked to the motor.

The invention aims, in addition, to enable the realisation of such a process on the basis of regulators that are simple to implement, for example regulators of proportional-integral type.

It should be noted that, throughout the text, the term 'proportional-integral regulator' or, in brief, 'PI regulator' is used to designate a block for regulation of an output variable as a function of an input variable including an action at least in the integral part. These terms therefore cover the conventional regulators having proportional and integral action, but also the RST regulators and any other form of regulation taking into account not only the present state of the input variable but also, even partially, its past state(s).

The invention is also directed towards a device for controlling an operating lever enabling the implementation of the process according to the invention.

In order to do this, the invention concerns a process for controlling a drive motor of an operating lever, notably a throttle lever of an aircraft, in which the operating lever is driven by a synchronous motor in opposition to a friction brake at a speed, the so-called set-point speed, determined by an autopilot system, said control process comprising the following steps:

measuring the angular position of the motor;
determining a speed of rotation of said motor;
determining a voltage value, the so-called nominal control voltage, for a feed of each winding of the motor in a closed loop as a function of the speed of rotation of the motor;
evaluating a value of an instantaneous torque provided by the motor, and comparing said value with a predetermined maximum torque value;
determining limiting values, so-called saturation limits, of the nominal control voltage as a function of the comparison of said torque values in order to obtain a limited control voltage;
feeding each winding of the motor with an alternating-voltage signal worked out on the basis of the limited control voltage in accordance with a predetermined sequence as a function of the angular position of the motor.

In this control process an autopilot system, for example that of an airplane, determines a thrust of the means of propulsion that is necessary for the flight phase currently being executed, and deduces therefrom a desired position of the lever of the throttle lever, and then a speed of displacement of this lever in order to go from the current position to the desired position. This speed is, if need be, transformed into a speed of rotation of the electric motor as a function of the kinetic linkage installed between the motor and the lever, and then provided by way of set-point speed at the input of the control process according to the invention.

It should be noted that the determination of the speed of rotation of the motor may preferentially be effected by calculation, for example by differentiation as a function of time of the measurement of the position of the motor, or directly by a measurement of this speed by an appropriate sensor (a tachogenerator, for example).

The inventors have noticed that, surprisingly, by regulating the voltage directly as a function of the difference of speed between the speed of rotation (measured or estimated) of the motor and the set-point speed, without using an interleaved loop for regulation of the current or of the torque, the control of the drive of the operating lever was greatly simplified and did not suffer from the inaccuracies associated with the fact that the current is substantially invariant when the torque demanded of the motor is exerted in opposition to a friction brake. Moreover, the regulation process utilises only a simple closed loop, without interleaved loop, for the speed regulation. In addition, in this loop the regulator calculating the voltage control as a function of the speed difference is a simple regulator, for example a regulator of proportional-integral type or a regulator of RST type, or any type of regulator having an action that is integral at least in part.

However, if the speed regulation is simplified, the absence of a closed loop with respect to the current presents the drawback of not limiting the torque of the motor in certain cases, and in particular in the case of regaining of control of the lever by the pilot in opposition to the set points transmitted by the autopilot system. This is why the process according to the invention provides a limitation of the instantaneous torque provided by the motor to a predetermined maximum torque value corresponding to the maximal admissible value of the torque that the pilot can accept being provided when he/she effects a regaining of control of the lever. To do this, the value of the instantaneous torque exerted or felt by the pilot is estimated, for example by evaluating or by measuring a value of the current consumed by the motor, or by measuring this torque directly by means of appropriate sensors linked to the lever, and a supplementary stage is introduced of limiting the value of the voltage control provided by the regulator of the principal regulation loop before applying this limited control to the feed of each winding of the motor.

Advantageously and according to the invention, the value of the instantaneous torque provided by the motor is evaluated on the basis of a value of current measured in at least one of the windings of the motor. Although the value of the current consumed by the motor is not a very precise measure of the torque delivered by said motor, it suffices at the time of great variations in torque, such as may occur at the time of regaining control of the lever by the pilot. The measurement of the current may be effected in one or more windings of the motor, or by means of the current absorbed by the converter feeding the motor, or by any other equivalent means.

Alternatively or in combination, and according to the invention, the value of the instantaneous torque provided by the motor is evaluated on the basis of a torque value provided by a torque sensor linked to the operating lever. It is, of course, possible to replace or to complement the evaluation of the torque of the motor by means of the current consumed, by installing a torque sensor on the axis of the motor so as to obtain direct information about the torque. The sensor may be realised in any appropriate manner, for example by installing a strain gage at a known distance from the axis of the lever.

Advantageously and according to the invention, a three-phase direct-current motor without brushes is chosen, and the feed of each winding of the motor is effected by means of gating pulses of a voltage equal to the limited control voltage in accordance with a so-called six-state sequence. The process according to the invention may be applied, in its generality, to numerous types of motor and for control of said motors. It may thus be applied to a direct-current motor without brushes, driven by a converter feeding each winding in accordance with a sequence of positive or negative gating pulses of voltage as a function of the position of the motor.

Advantageously and according to the invention, a three-phase synchronous motor is chosen, notably with permanent magnets, and the feed of each winding is effected with a sinusoidal voltage, the maximum value of which is equal to the limited control voltage. By feeding the motor with an inverter supplying a sinusoidal voltage to each winding as a function of the position of the motor, it is possible to control the torque thereof by limiting the maximal voltage or peak voltage of the sinusoidal signal.

Advantageously and according to the invention, the motor is driven in accordance with a vectorial control in which a first voltage, the so-called direct voltage, and a second voltage, the so-called quadratic voltage, are defined, characterised in that the nominal control voltage is applied as quadratic voltage in the closed loop as a function of the speed of rotation of the motor.

The use of a vectorial control is a preferred mode of implementation of the process, because it enables, in particular, a better command of the torque at low speed of rotation. In addition, electronic circuits enabling the PARK and CONCORDIA transforms, which are necessary for this control to be realised in real time are readily accessible nowadays. By regulating the quadratic voltage directly as a function of the speed difference, without passing through an interleaved loop for regulation of the quadratic current, the control of the drive of the operating lever is greatly simplified and does not suffer from the inaccuracies associated with the fact that the quadratic current is substantially invariant when the torque demanded of the motor is exerted in opposition to a friction brake. Moreover, the regulation process uses only a simple closed loop, without interleaved loop, for the speed regulation. In addition, in this loop the regulator calculating the control of quadratic voltage as a function of the speed difference is a simple regulator, for example a regulator of proportional-integral type or of RST type. Of course, the control process according to the invention retains, in parallel with the previous speed regulation, a closed-loop regulation of the direct voltage as a function of a difference between a set point of direct current and a measured value of this current, this regulation having the aim, as known as such, of controlling the flux of the motor in order to minimise the losses due to the Joule effect.

The closed-loop regulation of the quadratic voltage includes a step of limiting this voltage to a predetermined voltage interval. In order to avoid a situation where the pilot has to exert a significant force on the lever when regaining control of said lever, the invention provides for limiting the quadratic voltage controlling the motor, for example by interposing a saturator between the regulator determining the quadratic control voltage and the quadratic control voltage effectively applied. A saturation of the quadratic control voltage brings about, through the effect of Ohm's law, a saturation of the quadratic current and therefore a limitation of the motor torque of the motor for driving the lever. Thus the force to be provided by the pilot in order to regain control of the operating lever can be limited.

Advantageously and according to the invention, the saturation limits of the quadratic voltage are variable as a function of the measured value of the quadratic current. Since the value of the quadratic current does not depend solely on the saturation value of the quadratic control voltage, but also on the resistance of the windings of the motor, on the temperature, etc., the invention provides that the voltage interval defined by the saturation limits of the quadratic control voltage is variable as a function of the measurement of the quadratic current. Thus, under the given temperature conditions for a given motor, the higher the measurement of the quadratic current, the lower will be the saturation limits of the quadratic voltage in order to maintain the force for regaining control of the lever within the predetermined limits.

Advantageously and according to the invention, the limiting values of the quadratic voltage are determined by a proportional-integral regulator as a function of a difference between the measured value of the quadratic current and a set-point value corresponding to a maximum tolerated torque exerted on the operating lever. Thus in the case of a vectorial control the saturation of the quadratic voltage is subjugated to the quadratic current representing the maximum acceptable limit of the torque felt by the pilot when regaining control of the throttle lever.

Advantageously and according to the invention, the predetermined voltage interval is variable as a function of a torque exerted on the operating lever.

Advantageously and according to the invention, the saturation limits of the quadratic voltage are determined by a proportional-integral regulator as a function of a difference between a measured value of the torque applied to the operating lever and a set-point value corresponding to a maximum tolerated torque exerted by a pilot on the operating lever. In this variant of the control process according to the invention a torque sensor is installed in the region of the operating lever in order to measure the real torque exerted by the pilot for regaining control, and this measurement is used in order to cause the saturation limits of the voltage applied to the motor to vary. Thus the greater the measured force for regaining control, the lower is the saturation limit of the quadratic voltage applied to the motor, so the motor torque is reduced, and the force for regaining control is limited.

Advantageously and according to the invention, the proportional-integral regulator includes an anti-accumulation circuit that is suitable to avoid an overflow of the integral term of the regulator. In order that the saturation limit of the voltage is corrected as a function of the current or directly as a function of the torque exerted by the pilot, it is advisable to avoid a situation where the overflow of the integral term of the regulator brings about delays or overshoots in the control of the saturation limit of the voltage, in order to avoid jerks or hard points felt by the pilot. The process of the invention therefore provides for integrating an anti-accumulation circuit aiming to reduce the influence of the integral term when the latter exceeds a predetermined threshold.

With the aim of simplification, the present description uses the particular case of an operating lever pivoting about an axis which is common with that of the electric motor and driven directly by said motor. In this way, the displacement of the lever is a rotation that corresponds to the rotation of the motor, with the same angular displacement, and the speed of displacement of the lever is equal to the speed of rotation of the motor. However, this simplification does not constitute a limitation of the scope of the invention, which extends to any type of movement of the lever and to any type of rule of correspondence between the speed of displacement of the lever and the speed of rotation of the electric motor, this rule of correspondence depending on the kinetic linkage installed between the lever and the motor.

The invention extends likewise to a device for controlling an operating lever, notably a throttle lever of an aircraft, comprising a synchronous motor that is suitable to drive the lever in opposition to a friction brake, a position sensor that is suitable to provide an angular position of the motor, and a control computer including a converter that is suitable to feed the motor, said device being characterised in that the control computer comprises:
means that are suitable to determine a speed of rotation of the motor;
a first regulator that is suitable to define a voltage value, the so-called nominal control voltage, in a closed loop as a function of a difference between the speed of rotation of the motor and a set-point speed;
a second regulator that is suitable to determine limiting values, so-called saturation limits, of the nominal control voltage as a function of a difference between an instantaneous torque provided by the motor and a predetermined limiting torque;
a saturator that is suitable to provide a limited control voltage on the basis of the nominal control voltage and on the basis of the saturation limits provided by the second regulator;
and in that the converter feeds each winding of the motor with an alternating-voltage signal worked out on the basis of the limited control voltage in accordance with a predetermined sequence as a function of the angular position of the motor.

As seen previously, the means for determining the speed of rotation of the motor may be calculating means such as a differentiating circuit enabling the speed of rotation of the motor to be calculated on the basis of a temporal variation of the angular position provided by the position sensor, or means for direct measurement of the speed of rotation by using an appropriate sensor (a tachogenerator, for example).

Advantageously and according to the invention, the control device is suitable for vectorial control of the motor and is characterised in that the converter includes a first block for direct vectorial transformation that is suitable to drive, on the basis of the limited control voltage used as quadratic voltage, an inverter feeding each winding of the motor as a function of the angular position of the motor, and a second block for inverse vectorial transformation that is suitable to provide a value of the resultant quadratic current to the control computer. Thus, even when use is made of a vectorial control that nevertheless is reputed to be complex, the device simply includes a closed loop for regulation of the quadratic voltage as a function of the difference between the speed of rotation of the motor and the set-point speed, the regulator of which is a proportional-integral regulator. The quadratic control voltage is applied after saturation to the block for direct vectorial transformation. In turn, the block for inverse vectorial transformation provides a value of the quadratic current.

Advantageously and according to the invention, the device includes, in addition, a closed-loop regulation of a direct voltage as a function of the direct current. In vectorial control the regulation of the direct voltage is retained so as to limit the flux of the motor.

Advantageously and according to the invention, the device includes, in addition, a torque sensor that is suitable to measure a value of a torque exerted by a pilot on the operating lever and to transmit said torque value to the second regulator of the control computer so as to limit the value of the torque to a maximum tolerated torque exerted by a pilot on the operating lever.

Advantageously and according to the invention, the second regulator includes an anti-accumulation circuit. Whatever the control variable being used for the second regulator (current or torque), the installation of an anti-accumulation circuit enables the overflow of the integral part of the regulation to be limited or avoided, in order to bring under control the time for return to normal of the saturation limits after an action for regaining control of the throttle lever.

The invention also concerns a control process and a control device that are characterised in combination by all or some of the characteristics mentioned heretofore or hereinafter, as well as an aircraft including an operating lever provided with a control device according to all or some of the characteristics mentioned heretofore or hereinafter.

Other objectives, characteristics and advantages of the invention will become apparent in the light of the description that follows and the appended drawings in which:

DETAILED DESCRIPTION OF THE INVENTION

Figure 1:
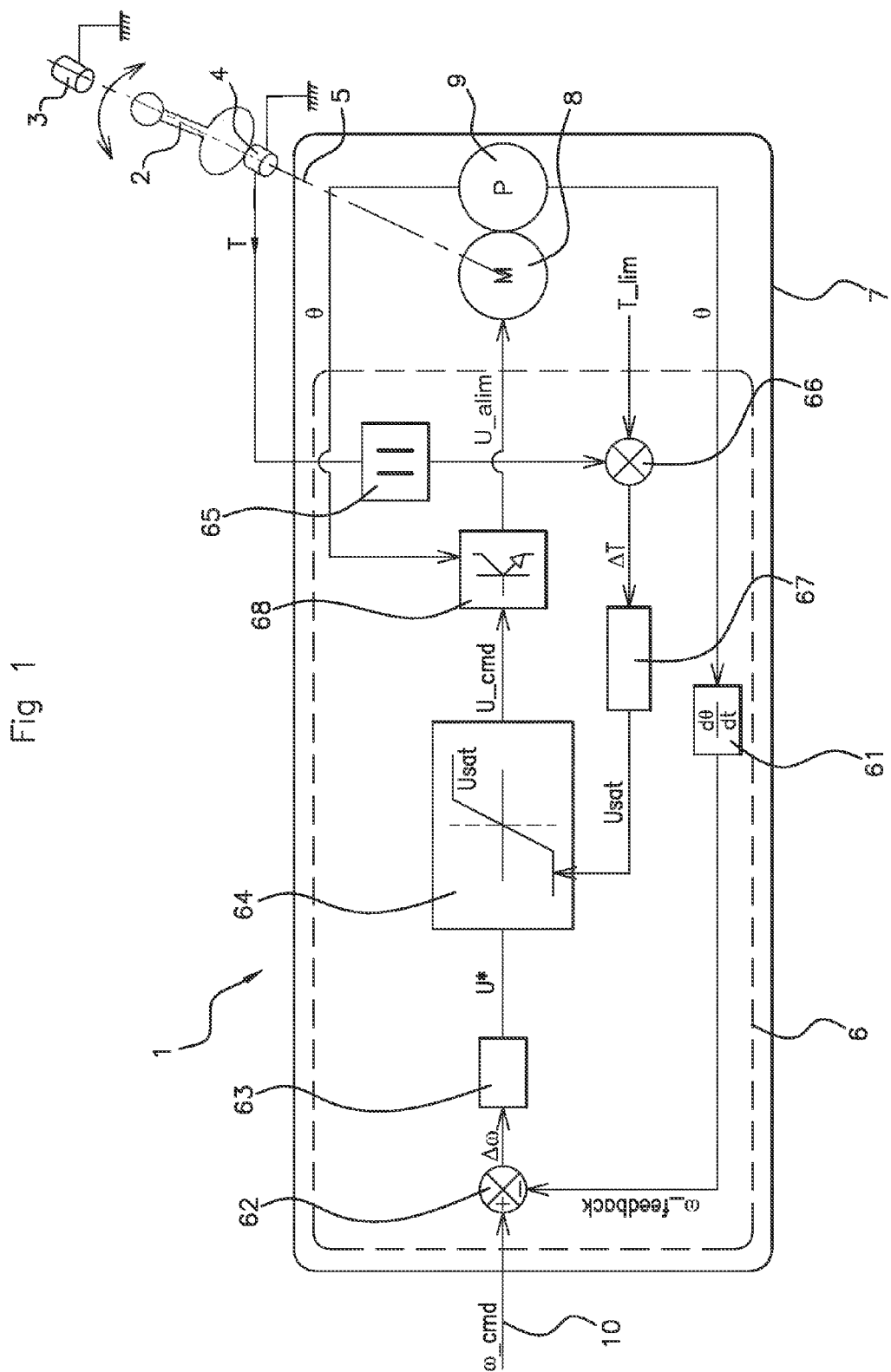
FIG. 1 represents a block diagram of the device according to the invention, illustrating the process according to the invention.

The control device 1 represented in FIG. 1 includes a control lever 2 which is integral with an axis 5 of rotation of a three-phase motor 8 of synchronous type having permanent magnets and which is suitable to pivot about this axis under the influence of the rotation of the motor 8 or of a force applied to the lever by a pilot. By way of example, the lever 2 may be part of a throttle lever enabling control of the propulsion of an aircraft or of any other vehicle, or may be part of an element for control of a control surface, such as the control of the flaps of an aircraft or of elevators of a submarine, etc. In the description that follows, the example being described is an aircraft throttle lever, without this being capable of being interpreted as a limitation of the field of application of the process or of the device according to the invention.

Neither is the invention limited to the case where the motor 8 is directly linked to the lever 2, the two elements exhibiting the same angular deflection; the invention also extends to the case where the motor 8 is linked to the lever 2 by means of a reversible reduction gearing enabling a reduction between the angle of rotation of the motor 8 and that of the lever 2.

The rotation of the motor 8 and of the lever 2 is effected in opposition to a friction brake 3 arranged on the axis 5 common to the lever and to the motor.

If need be, as provided in one of the variants of the invention a torque sensor 4 measures the resultant torque T applied to the shaft of the motor 8 by the motor itself, the brake 3 and a torque generated by the hand of a pilot exerting a force on the lever 2.

The motor 8 is coupled to a position sensor 9 providing the angular position θ of the motor. A control computer 6 includes a converter 68 which feeds the various windings of the motor with a feed voltage U_alim. This feed voltage may be, in the general case, a sinusoidal alternating voltage of general form:

$$U\_alim = U\_cmd \sin(\theta(t)+\phi)$$

where θ(t) is the angular position of the motor with respect to a predefined coordinate system in which the value of the phase φ is 0 for a first winding, 2Π/3 and 4Π/3 for the other two windings of a three-phase motor.

The computer 6 includes a differentiating circuit 61 receiving the angular position θ of the motor and providing a speed of rotation ω_feedback of said motor by differentiation of the angular position with respect to time. The speed ω_feedback is compared in a summing circuit 62 to a set-point speed ω_cmd defined by an autopilot device. The resultant speed difference Δω is processed in a first regulator 63, for example a proportional-integral regulator, so as to provide a nominal control voltage U* aiming to annul this speed difference.

The nominal control voltage U* is then transmitted to a saturator 64. The saturator 64 provides at its output a limited control voltage U_cmd equal to a saturation value +Usat if the nominal control voltage U* is greater than Usat, or equal to a saturation value −Usat if said nominal control voltage is less than −Usat. If the nominal control voltage U* is contained between these two saturation limits, the limited control voltage U_cmd is equal to U*.

The limited control voltage U_cmd is then transmitted to the converter 68 which forms the feed voltage of the windings of the motor as a function of the position of said motor and as a function of a peak voltage value equal to the limited control voltage.

In the example represented in FIG. 1, a torque sensor 4 is coupled to the operating lever 2 in order to provide a value of a resultant torque T applied to the shaft of the motor 8 by the motor itself, the brake 3 and a possible torque generated by the hand of a pilot exerting a force on the lever 2.

In the absence of any action of the pilot on the lever 2, the motor torque is equal to the resisting torque opposed by the friction brake 3 and is substantially constant, whatever the speed of rotation of the motor.

When the pilot intervenes and implements a regaining of control of the lever 2, the speed of rotation ω_feedback of the motor is modified and departs from the set-point speed ω_cmd. The first regulator 63 then attempts to compensate this difference by increasing the nominal control voltage U* and therefore the torque exerted by the motor in opposition to the action of the pilot. In order to avoid a situation where the pilot has to exert too significant a force at the time of this regaining of control, the torque T measured by the torque sensor 4 is compared to a set-point value T_lim corresponding to the maximum torque tolerated by the pilot when regaining control of the throttle lever. To do this, the absolute value of the algebraic value of the torque T is formed, in order to be independent of the sign of the torque T, and this absolute value is compared with the set-point value T_lim in a summing circuit 66. The torque difference ΔT thus formed is supplied to a second regulator 67, itself also of proportional-integral type, which modifies the saturation limits +Usat and −Usat so as to subjugate the interval between the limits to the torque difference ΔT. In practice, the interval between the saturation limits is especially small, since the torque difference ΔT is close to zero.

So as soon as the torque felt by the pilot at the time of a regaining of control of the throttle lever approaches the tolerated maximum, the saturation limits +Usat and −Usat of the nominal control voltage U* approach one another and decrease in absolute value, therefore reducing the limited control voltage U_cmd. Accordingly, the windings of the motor are fed by a weaker voltage, and the resisting torque provided by the motor decreases, thus enabling a regaining of control with a limited torque.

Figure 2:
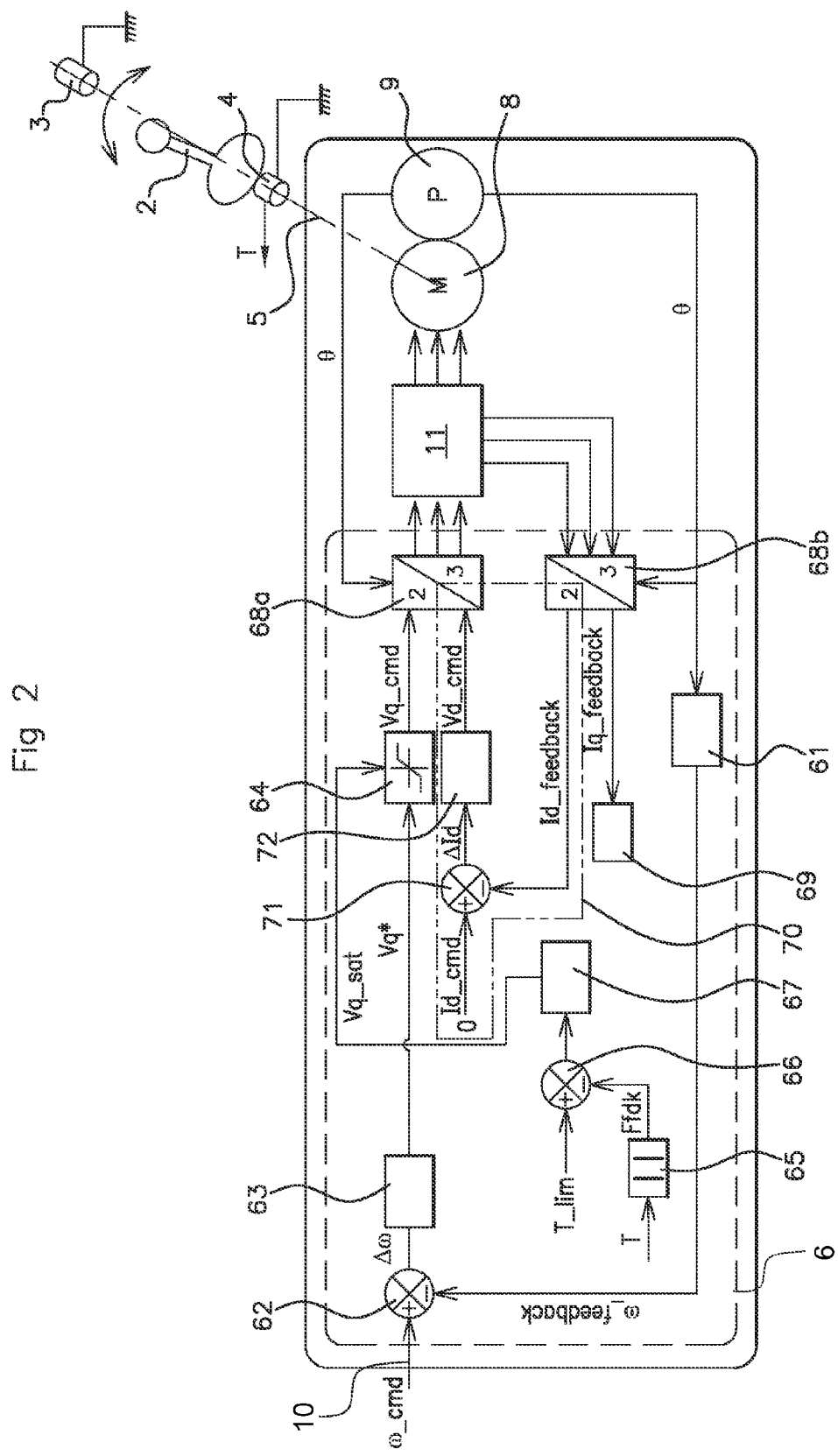
FIG. 2 represents a block diagram of the device according to the invention, illustrating a first variant of the process according to the invention applied to a vectorial control of the motor.

Reference will now be made to FIG. 2 of the attached drawing, in which a variant of the process and of the device according to the invention have been represented that are suitable for vectorial control of the motor 8.

The computer 6 includes a first block 68a for direct vectorial transformation, which works out the three-phase controls on the basis of two control voltages: a first voltage, the so-called direct control voltage Vd_cmd, and a second voltage, the so-called quadratic control voltage Vq_cmd, and on the basis of the angular position θ of the motor provided by the sensor 9. The computer 6 also includes a second block 68b for inverse vectorial transformation, which receives data from an inverter 11 controlled by block 68a and the position θ originating from the position sensor 9. The second block 68b provides, in turn, a measured value of a first current, the so-called direct current Id_feedback, and of a second current, the so-called quadratic current Iq_feedback. The direct-vectorial-transformation block 68a and the inverse-vectorial-transformation block 68b form with the inverter the equivalent of the converter 68 of the previous example.

The control computer 6 includes a first closed-loop regulation, the so-called direct regulation 70, defining in a regulator 72 the direct control voltage Vd_cmd as a function of a difference ΔId formed by a summing circuit 71 between the direct current Id_feedback and a set point in terms of current Id_cmd. Preferentially the set point of direct current Id_cmd is fixed at a zero value, in order to minimise the losses due to the Joule effect in the windings of the motor 8.

The control computer 6 also includes a second closed-loop regulation, the so-called quadratic regulation, enabling the quadratic control voltage Vq_cmd to be defined. An autopilot system (not represented) supplies at the input 10 of the computer 6 a set-point speed ω_cmd to be applied to the motor 8. This set-point speed is compared by means of a summing circuit 62 to the real speed of rotation ω_feedback of the motor 8, obtained in the differentiating circuit 61 by differentiation with respect to time of the angular position θ of the motor provided by the position sensor 9. The speed difference Δω at the output of the comparator 62 is transmitted to a speed regulator 63 which provides, in turn, a value of nominal quadratic control voltage Vq*. The regulator 63 may be realised very simply in the form of a proportional-integral regulator. The inventors have in fact noticed that, despite the near invariance of the resisting torque opposed by the friction brake 3, which brings about control difficulties when employing, as in the prior art, an interleaved loop with respect to the quadratic current, there is an unambiguous correspondence between the speed of rotation of the motor and the quadratic voltage Vq applied to said motor.

The nominal quadratic control voltage Vq* is then transmitted to a saturator 64, the function of which is to limit the value of the nominal control voltage to a limited control voltage Vq_cmd applied to the motor, in order to limit the quadratic current Iq in the motor and therefore the maximum torque exerted by said motor. This torque limitation is realised, as in the previous example, by comparing, in the summing circuit 66, the absolute value of the torque T measured by the torque sensor 4 to a set-point torque T_lim and then by supplying the torque difference ΔT to the PI regulator 67, in order to limit the force for regaining control that is exerted by the pilot when the latter feels the need to regain control of the operating lever in opposition to the autopilot system.

It is in fact interesting to note that the quadratic current Iq is not used in the loop for controlling the speed of the motor 8. However, the value of the quadratic current Iq_feedback is provided by block 68b for inverse vectorial transformation but is only used for the purposes of surveillance in a surveillance block 69.

Figure 3:
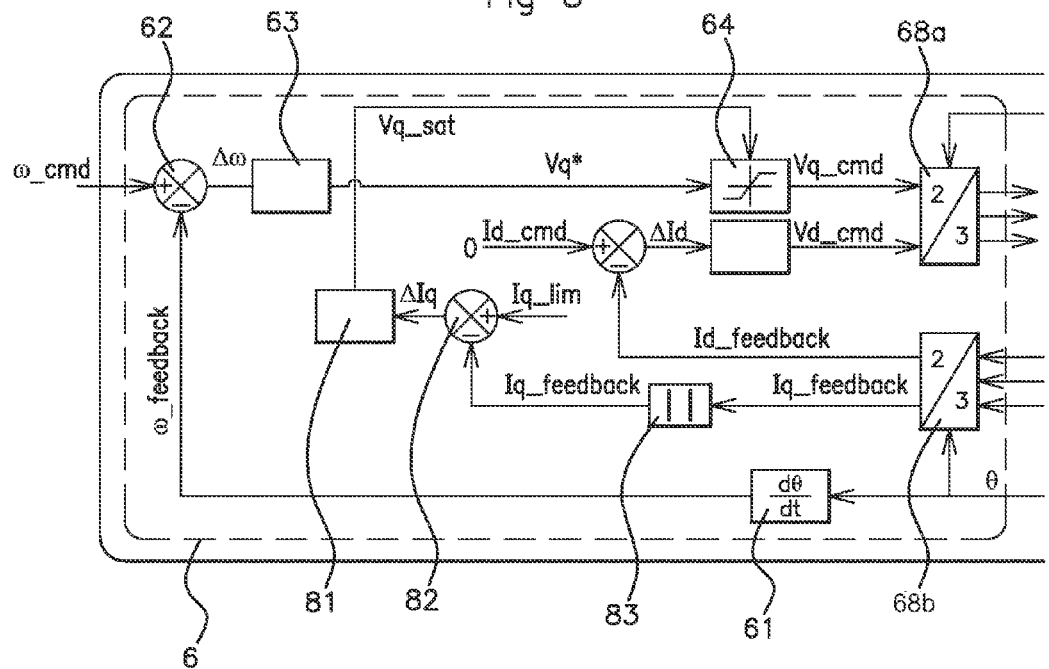
FIG. 3 is a view of the block diagram of a control computer of the device according to the invention, illustrating a second variant of the process according to the invention.

Reference will now be made to FIG. 3 of the attached drawing, in order to describe a variant of the implementation of the process described heretofore. As has been seen, the raw quadratic control voltage Vq* determined by the proportional-integral regulator 65 is transmitted to a saturator 64 which provides at its output a quadratic control voltage Vq_cmd which is equal to Vq* if Vq* pertains to a voltage interval contained between two predetermined values −Vq_sat and +Vq_sat and which is equal to −Vq_sat if Vq* is less than or equal to this value, or to +Vq_sat if Vq* is greater than or equal to this value.

In the variant of the process described in connection with FIG. 2, use is made of a saturator 64 in which the saturation limits +Vq_sat and −Vq_sat are variable as a function of the quadratic current Iq_feedback provided by block 68b. In fact, in view of the scattering of the resistance values of the windings of the motor 8, in particular as a function of the operating temperatures of the motor, the quadratic current circulating in the motor, an image of the motor torque and therefore of the torque to be exerted by the pilot in order to overcome this torque when regaining control of the throttle lever, may also be variable for the same saturation voltage. In order to limit the force for regaining control of the throttle lever, the invention provides for correcting the width of the interval of saturation voltage as a function of a difference between the measured quadratic current Iq_feedback and a set-point value Iq_lim of the quadratic current corresponding to a limiting force to be exerted by the pilot in order to regain control of the throttle lever.

The quadratic current Iq_feedback measured in algebraic value at the output of block 68b is firstly made positive by taking the absolute value thereof in a block 83, and then this absolute value is compared to the set-point value Iq_lim in a comparator 82. The difference ΔIq thus obtained is supplied to a saturation-voltage regulator 81 which provides the saturation limits of the saturator 64. This regulator 81 may also be realised very simply by a proportional-integral regulator. The operation of this regulator 81 is such that as long as Iq_feedback is less than Iq_lim, which is the general case corresponding to a force for regaining control that is less than the limiting force, the integral correction saturates and forces the output value Vq_sat to increase up to a maximum limit enabling a maximum of variation of the quadratic control voltage Vq_cmd. As soon as Iq_feedback approaches Iq_lim or exceeds it, the output value Vq_sat decreases so as to limit the quadratic control voltage Vq_cmd and therefore to limit the quadratic current Iq_feedback to the value Iq_lim which is representative of the limiting force tolerated for the regaining of control.

Owing to this loop for correction of the saturation value of the quadratic control voltage it is possible to maintain the force for regaining control of the lever at a precise value without thereby making the speed regulation of the electric motor 8 more complex.

Whatever the variant of the process, with a correction of the saturation limits as a function of an error ΔIq in respect of the quadratic current or as a function of an error in the torque ΔT, it is important not to limit the quadratic control current Vq_cmd for too long and in too pronounced a manner, therefore to limit the influence of the integral term of the regulation implemented by the regulator 67 or 81 on the saturation values Vq_sat.

Figure 4:
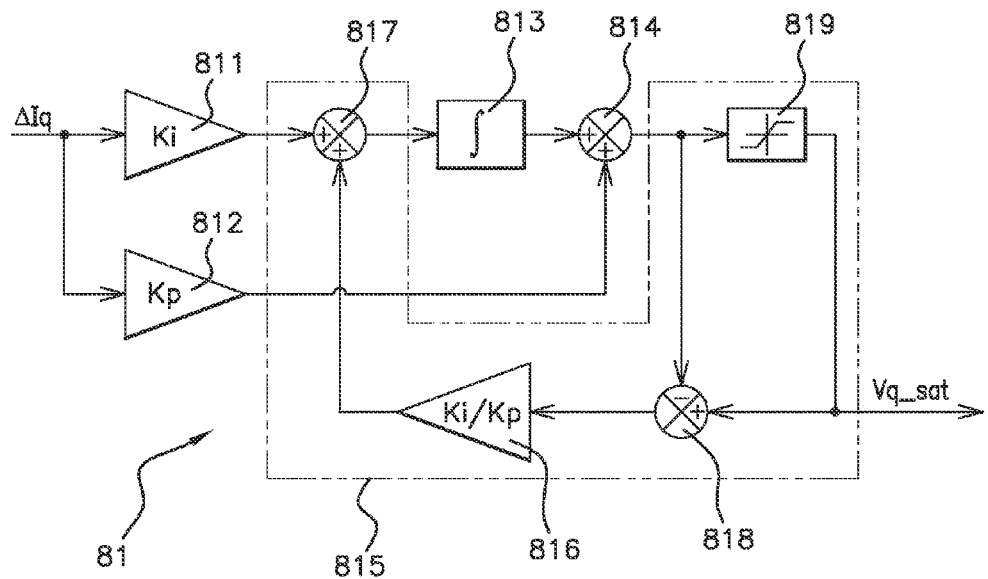
FIG. 4 represents a detail of a regulator forming part of the process according to the invention.

To this end, the regulators are provided with an anti-accumulation circuit 815 illustrated in FIG. 4 in connection with the regulator 81. The current error ΔIq is transmitted, on the one hand, to an amplifier 812 applying a proportional gain Kp and, on the other hand, to an amplifier 811 applying an integral gain Ki. The error amplified by the gain Ki is transmitted to a block 813 for integration as a function of time, and then to a summing circuit 814 where it is added to the proportional term of the regulation originating from amplifier 812. The anti-accumulation circuit 815 compares the output of the summing circuit 814 to this same output, limited in a saturator 819, in a comparator 818. The comparator 818 supplies an output that is of zero value if the output of the summing circuit 814 is within the limits of the saturator 819, or negative and representative of the peak-clipping effected if the output of the summing circuit 814 is outside the saturation limits. This negative value or zero value is amplified in amplifier 816 of gain Ki/Kp and then added in a summing circuit 817 to the error amplified by the gain Ki at the output of amplifier 811. In this way, the integral term of the regulation is reduced when the saturation limit Vq_sat of the quadratic control voltage Vq_cmd exceeds a predetermined threshold.

Of course, this description is given solely by way of illustrative example, and a person skilled in the art will be able to make numerous modifications to it without departing from the scope of the invention, such as, for example, applying the process or the device to other control surfaces such as the control of the lift flaps of an aircraft, the rudder control of a ship, etc.

The invention claimed is:

1. A process for controlling a motor configured to drive an operating lever, the operating lever being a throttle lever of an aircraft, the operating lever being driven by a synchronous motor in opposition to a friction brake arranged on an axis common to the operating lever and the synchronous motor at a set-point speed determined by an autopilot system, said control process comprising:
   measuring an angular position of the motor using a position sensor;
   determining a speed of rotation of said motor using at least one of a speed sensor and a position differentiation circuit;
   determining a nominal control voltage for a feed of each winding of the motor in a closed loop as a function of the speed of rotation of the motor, using at least one processor;
   evaluating a value of an instantaneous torque provided by the motor using a measurement device and comparing said value with a predetermined value of maximum torque using the at least one processor;
   determining saturation limits of the nominal control voltage as a function of the comparison of said torque values in order to obtain a limited control voltage using the at least one processor; and
   feeding each winding of the motor with an alternating-voltage signal determined based on the limited control voltage in accordance with a predetermined sequence as a function of the angular position of the motor,
   wherein said predetermined value of maximum torque corresponds to a maximum admissible value of the instantaneous torque estimated that a pilot can accept being provided when regaining control of the throttle lever.

2. The process as claimed in claim 1, wherein the motor is a three-phase direct-current motor without brushes, and the feed of each winding of the motor is effected by gating pulses of a voltage equal to the limited control voltage in accordance with a six-state sequence.

3. The process as claimed in claim 1, wherein the motor is a three-phase synchronous motor with permanent magnets, and
   the feed of each winding is effected with a sinusoidal voltage, the maximum value of the sinusoidal voltage being equal to the limited control voltage.

4. The process as claimed in claim 1, wherein the motor is driven in accordance with a vectorial control in which a first voltage that is the direct voltage, and a second voltage that is the quadratic voltage, are defined, and
   wherein the nominal control voltage is applied as quadratic voltage in the closed loop as a function of the speed of rotation of the motor.

5. The process as claimed in claim 4, wherein the saturation limits of the quadratic voltage are variable as a function of the measured value of the quadratic current.

6. The process as claimed in claim 5, wherein the saturation limits of the quadratic voltage are determined by a proportional-integral regulator as a function of a difference between the measured value of the quadratic current and a set-point value corresponding to a tolerated maximum torque exerted on the operating lever.

7. The process as claimed in claim 4, wherein the saturation limits of the quadratic voltage are determined by a proportional-integral regulator as a function of a difference between the measured value of the quadratic current and a set-point value corresponding to a tolerated maximum torque exerted on the operating lever.

8. The process as claimed in claim 7, wherein the proportional-integral regulator includes an anti-accumulation circuit that is configured to avoid an overflow of the integral term of the regulator.

9. The process as claimed in claim 4, wherein the saturation limits of the quadratic voltage are determined by a proportional-integral regulator as a function of a difference between a measured value of the torque applied to the operating lever and a set-point value corresponding to a tolerated maximum torque exerted by a pilot on the operating lever.

10. An aircraft comprising:
    a control device and a control computer configured to implement the control process as claimed in claim 1.

11. A device for controlling an operating lever, the operating lever being a throttle lever of an aircraft, the device comprising:
    a synchronous motor configured to drive the lever in opposition to a friction brake arranged on an axis common to the operating lever and the synchronous motor;
    a position sensor configured to provide a position of the lever; and
    a control computer including a converter configured to feed the motor, the control computer comprising
    means for determining a speed of rotation of the motor,
    a first regulator configured to define a nominal control voltage in a closed loop as a function of a difference between the speed of rotation of the motor and a set-point speed,
    a second regulator configured to determine saturation limits of the nominal control voltage as a function of a difference between an instantaneous torque provided by the motor and a predetermined limiting torque, and a saturator configured to provide a limited control voltage based on the nominal control voltage and the saturation limits provided by the second regulator, wherein the converter feeds each winding of the motor with an alternating-voltage signal determined based on the limited control voltage in accordance with a predetermined sequence as a function of the angular position of the motor, and wherein said predetermined value of maximum torque corresponds to a maximum admissible value of the instantaneous torque estimated that a pilot can accept being provided when regaining control of the throttle lever.

12. The device as claimed in claim 11, wherein the device is configured to vectorially control the motor, and the converter includes a first, direct-vectorial-transformation block that is configured to drive, based on the limited control voltage used as the quadratic voltage, an inverter feeding each winding of the motor as a function of the angular position of the motor, and a second, inverse-vectorial-transformation block that is configured to provide a value of the resultant quadratic current to the control computer.

13. The device as claimed in claim 12, further comprising a closed-loop regulation of a direct voltage as a function of the direct current.

14. The device as claimed in claim 11, further comprising a torque sensor linked to the operating lever, the torque sensor being configured to measure a value of a torque exerted by a pilot on the operating lever and to transmit said torque value to the second regulator of the control computer to limit the value of the torque to a maximum desirable torque exerted by a pilot on the operating lever.

15. The device as claimed in claim 11, wherein the second regulator includes an anti-accumulation circuit.

16. An aircraft comprising:

an operating lever provided with the control device as claimed in claim 11.

* * * * *